United States Patent [19]

Kesselring

[11] Patent Number: 4,896,053
[45] Date of Patent: Jan. 23, 1990

[54] SOLITARY WAVE CIRCUIT FOR NEURAL NETWORK EMULATION

[76] Inventor: Robert L. Kesselring, 422 Rustic Cir., Richardson, Tex. 75080

[21] Appl. No.: 226,034

[22] Filed: Jul. 29, 1988

[51] Int. Cl.⁴ .................... H03K 19/08; H03K 19/12; H03K 19/20
[52] U.S. Cl. .................................. 307/201; 364/900; 364/200
[58] Field of Search ................ 364/900, 200; 307/201

[56] References Cited

U.S. PATENT DOCUMENTS 3,238,504 3/1966 Crane ............................... 307/201

Primary Examiner—Stanley D. Miller
Assistant Examiner—Margaret R. Wambach
Attorney, Agent, or Firm—David H. Judson

[57] ABSTRACT

A circuit for emulating a nerve cell is used to generate one or more simple neural networks. In the preferred embodiment, the circuit comprises an LC ladder circuit including one or more modules, each of the modules comprising an "L" two-port circuit comprising a first shunt branch having a variable capacitor, a second shunt branch having a series-connected conductance and a variable d.c. bias source, and a third branch connected in series with the first and second branches, the third branch comprising an active inductor. The inductor is formed by one or more operational amplifiers interconnected in a feedback configuration. Each of the variable capacitances and the inductances cooperate to emulate a portion of a neuron by receiving a stimulus and generating or propagating a unidirectional solitary wave output representing an action potential.

14 Claims, 3 Drawing Sheets

CLASS I    $R_{eff} + Re(Z_{in}) \ll 0$
CLASS II   $R_{eff} + Re(Z_{in}) \approx 0$   BOUNDARY CONDITIONS
CLASS III  $R_{eff} + Re(Z_{in}) \gg 0$

NEURON

| CLASS I | $Reff + Re(Zin) \ll 0$ | |
|---|---|---|
| CLASS II | $Reff + Re(Zin) \approx 0$ | BOUNDARY CONDITIONS |
| CLASS III | $Reff + Re(Zin) \gg 0$ | |

SOLITARY WAVE CIRCUIT FOR NEURAL NETWORK EMULATION

TECHNICAL FIELD

The present invention relates generally to neural networks and more particularly to a solitary wave circuit for emulating one or more components of the central nervous system.

BACKGROUND OF THE INVENTION

It is known in the prior art to model various functions of a simple biological nervous system using a so-called "neural network". A neural network is generally defined by an interconnected set of functional modules which are based on a set of non-linear differential equations. Alternatively, such prior art neural networks have been derived from crude, hardware-intensive circuits, or so-called "neuromimes." Because so little is known about the interconnected structure of complex neural systems, such functional modules or neuromime circuits are mere constructs based on best estimates and analogy to observed physiological responses.

While neural networks theoretically have widespread applications in artificial intelligence and expert systems, the models upon which such networks are based do not truly represent how nervous systems in general and nerve cells in particular operate. It would therefore be desirable to provide a simple electronic circuit which could be used to emulate or model one or more components of a true biological-based nervous system.

BRIEF SUMMARY OF THE INVENTION

It is therefore an object of the present invention to describe circuits for use in modeling biological responses of a nervous system.

It is yet another object of the invention to describe an electronic circuit for use as a basic building block of a neural network to model nervous system configurations and responses.

It is a further object of the invention to describe one or more circuits through which solitary waves possessing nerve action potentials are transmitted to emulate a neuron, or a synapse between neurons, of a nervous system.

It is another object of the invention to describe one or more circuits through which stable solitary waves, compatible with living nerve signals in waveform, voltage and current, are transmitted at propagation velocities found in biological neural networks.

It is yet a further object of the present invention to describe circuits which facilitate the formation of associative memories for emulating long-term and short-term memory characteristics.

It is still another object of the invention to describe an electronic circuit which may be manufactured by existing technology use in implementing cost-effective and biologically-based neural network and/or parallel-processing algorithms.

It is yet another object of the invention to describe circuit configurations capable of possessing propagation delays ranging from physiological velocities to computer processing speeds.

It is still another object of the invention to describe circuits which have the capability of performing learning functions in real-time.

These and other objects of the present invention are achieved through a solitary wave circuit for use in emulating one or more components of a biological nervous system. In the preferred embodiment, the solitary wave circuit includes one or more interconnected functional modules comprising an LC ladder network. Preferably, each of the functional modules is formed in a conventional "L" two-port configuration having first and second shunt branches, and a third transverse branch. The first shunt branch has a variable capacitance or "varactor", the second shunt branch has a series-connected conductance and variable d.c. bias means, and the third transverse branch has an inductance. According to a feature of the invention, the inductance is formed from an active, as opposed to passive, circuit means including one or more operational amplifiers. The use of an active circuit means as the inductor insures that signal transmission through the module is unidirectional with an adjustable propagation velocity. Each module advantageously functions to propagate an input signal as a solitary waveform or pulse train representing an action potential through a portion of a neuron. By modifying the effective value of the inductance across a number of interconnected modules, a neural network is formed to emulate a neuron.

BRIEF DESCRIPTION OF THE DRAWINGS

For a more complete understanding of the present invention and the advantages thereof, reference is now made to the following Description taken in conjunction with the accompanying Drawings in which:

FIG. 3b shows various input and output waveforms generated by the circuit of FIG. 3a;

DETAILED DESCRIPTION

Figure 1:
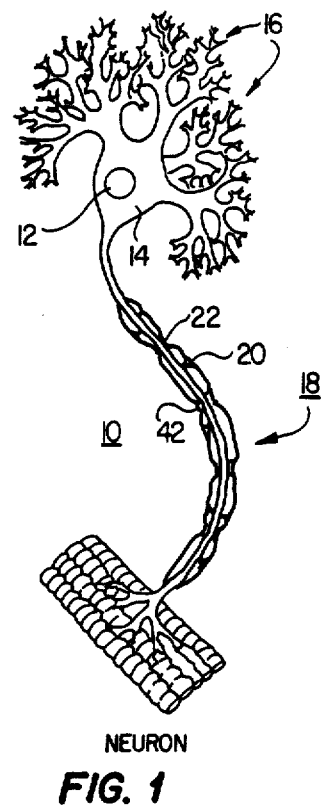
FIG. 1 is a schematic diagram of a neuron showing the constituent elements thereof.

With reference now to the drawings wherein like reference characters designate like or similar parts throughout the several views. FIG. 1 is a schematic diagram of a nerve cell or "neuron" 10. As is well known, the "neuron" 10 is the basic cell of the central nervous system and consists of a nucleated portion 12 and cytoplasmic extensions, a cell body 14, a plurality of dendrites 16 and an axon 18. The axon 18 is usually encased throughout the majority of its length by a myelin sheath 20, although not all nerve cells are myelinated. One or more bare patches 22 are provided along the length of the axon 18 for accelerating the nerve impulse. The axon 18 is the core of the neuron and generally serves to conduct impulses away from the cell body 14. The dendrites 16 are the branched parts of the neuron 10 and generally transmit impulses toward the cell body 14. Neurons are interconnected at a "synapse", which is an electrochemical barrier at which a nerve impulse passes from an axon of one neuron to the dendrite of another neuron. The neuron is fired upon receipt of an excitatory stimulus at one of the synapses; conversely, the neuron can be inhibited from firing by an inhibitory stimulus at a synapse. Upon firing, the neuron sets-up an "action potential" along its length to transmit the nerve impulse.

Figure 2A:
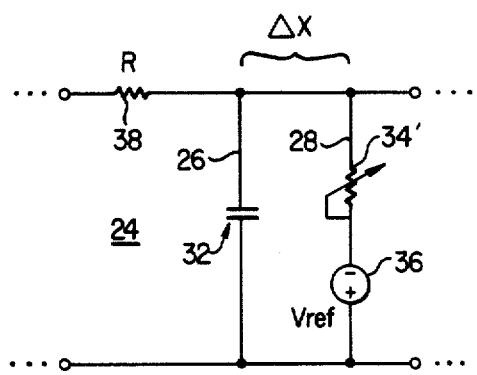
FIG. 2a is a conventional circuit model of a segment of the axon of the neuron shown in FIG. 1.

Action potentials of nerves are generated by the active transport of ions through cell walls, thus producing ionic currents. Sodium, a positive ion, contributes the most to the transmembrane potential as its intracellular concentration changes. In particular, sodium flows inward through the cell wall, pauses, and is then actively transported out of the cell as the action potential becomes more positive. Thereafter, the sodium pauses and then returns to the intracellular resting potential. The physical characteristics of the cell which produce this transport mechanism have been modeled in the prior art by Hodgkin-Huxley using a simplified lumped parameter transmission line equivalent circuit 24 such as generally shown in FIG. 2a. Circuit 24 represents a cylindrical segment of length $\Delta x$ of the axon 18 of FIG. 1. Circuit 24 comprises two shunt branches 26 and 28. Branch 26 includes a fixed capacitor 32 and branch 28 includes a shunt variable conductance 34 connected in series with a reference voltage source 36. The capacitor 32 stores energy to facilitate transmission of the action potential through the axon segment, and the shunt conductance 34 represents the high frequency behavior of the axon segment. Corresponding axon segments are separated by a transverse series resistance 38.

Figure 2B:
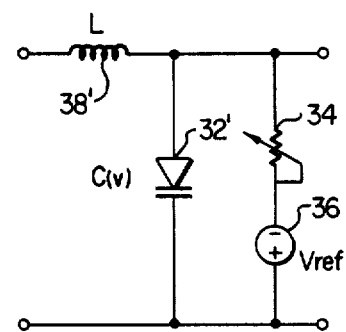
FIG. 2b is a transitional model of an alternate embodiment of the circuit of FIG. 2a according to the present invention.

According to a feature of the present invention, it has been found that the axon segment model 24 of FIG. 2a does not accurately represent a true equivalent circuit of the axon segment. In particular, examination of the real-time operation of so-called "solution-based" circuits has revealed that a more accurate emulation of an axon segment is provided by substituting an inductor means 38' for the resistance 38 and by substituting a varactor 32' for the fixed capacitor 32 in the circuit of FIG. 2a. This transitional model is shown in FIG. 2b. Although not seen in FIG. 2b, the transverse inductor means 38' includes an effective resistance in series with the inductance.

Figure 3A:
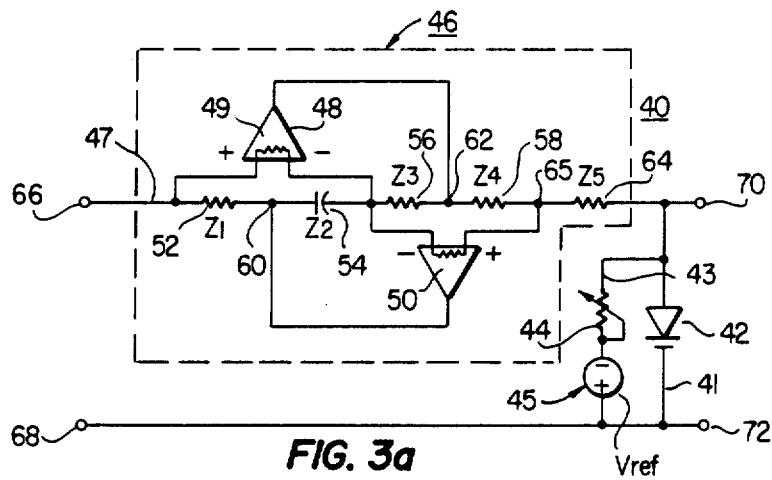
FIG. 3a is a schematic diagram of a preferred solitary wave circuit of the present invention for emulating one or more components of the central nervous system.

According to the present invention, it has been found that a further substitution of an active transverse inductor circuit in the transitional axon segment model 24 of FIG. 2b enables the resulting solitary wave network to more precisely model how the neuron segment generates and propagates an action potential. As will be described, the network also advantageously permits information to be encoded by multiplexing techniques as in biological circuits. Referring to FIG. 3a, a schematic diagram is shown of a preferred solitary wave circuit 40 according to the present invention for implementing this concept. As will be described, circuit 40 is designed to form the basic building block of a neural network comprising a plurality of such circuits cascaded in an LC ladder network and then interconnected. In this manner, information is processed in a parallel fashion.

The solitary wave circuit 40 comprises an "L" two-port circuit comprising a first shunt branch 41 having a voltage-variable capacitor 42 or "varactor", a second shunt branch 43 having a series-connected shunt conductance 44 and a (variable or fixed) reference voltage 45, and a branch 47 in series with branches 41 and 43. Branch 47 includes an active inductor means designated generally by the reference numeral 46. Preferably, the inductor means 46 comprises first and second operational amplifiers 48 and 50 connected in a feedback manner substantially as shown. Each of the operational amplifiers has an internal input resistance 49 across its input terminals when the input transistors (not shown) of the amplifiers are bipolar junction (BJT) transistors; alternatively, the internal input resistance 49 can be neglected if these transistors are junction field effect (JFET) transistors. The operational amplifier 48 also has a resistor 52 and a capacitor 54 connected across the input terminals thereof; operational amplifier 50 has a resistor 56 and a resistor 58 connected across the input terminals thereof. The output of the operational amplifier 50 is connected to a node 60 between the resistor 52 and the capacitor 54 while the output of the operational amplifier 48 is connected to a node 62 between the resistors 56 and 58. Another resistor 64 of the inductor means is connected in series from amplifier 50 input node 65 to node 70, the module output node. Each of the elements 52, 54, 56, 58 and 64 has a characteristic impedance "Z" such that the equivalent inductance "L" is defined by:

$$L = \frac{Z_1 \cdot Z_3 \cdot Z_5}{Z_2 \cdot Z_4}.$$

As also shown in FIG. 3a, the inductor means 46 and the variable capacitor 42/conductance 44 are connected as a voltage divider. The shunt conductance 44 and the d.c. reference voltage 45 are provided to decrease the effective d.c. bias of the circuit 40 and thereby prevent the circuit from clipping the applied input signal thereto. The reference voltage also establishes the capacitance of the varactor 42 and provides the physiological $-70$ mV resting potential to enable the module to be coupled directly to living neurons.

Figure 3B:
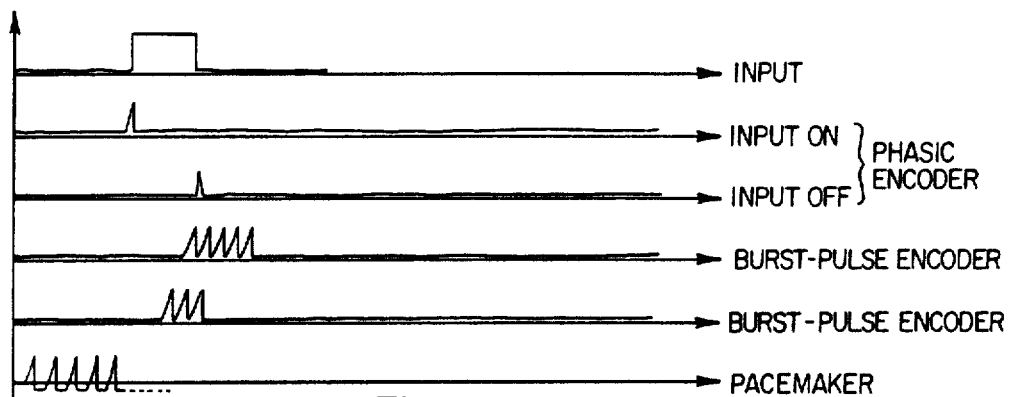

Referring now to FIG. 3b, circuit 40 may be either self-exciting (i.e., a pacemaker potential) or may receive an input signal across terminals 66 and 68. FIG. 3b also shows several waveforms generated by the circuit 40. The resulting signal is output across terminals 70 and 72 and is a solitary wave. Significantly, it has been found that the circuit 40 of FIG. 3a emulates how a neuron (or an axon segment of a neuron) generates and propagates an action potential. The circuit 40 is also advantageously used as a dendrite, a cell body, or a synapse between neurons to enable the building of neural networks. As will be described in more detail below, multiple inputs can be spatially or temporally summed by superposition at a cell body module or along a dendrite (formed by a module ladder) in a manner similar to that found in biological neurons.

When a solitary wave or pulse train is to be generated from a stimulus which exceeds an active transmission line threshold voltage, the passive transmission line of FIG. 3a becomes an active transmission line, and this change corresponds physically to the creation of inductance due to active sodium ion transport and increased transmission conductance. The existence of a longitudinal voltage difference as measured by the operational amplifiers 48 and 50 of FIG. 3a corresponds to a reduction in transmembrane resistance as is observed in biological nerves. Moreover, it has been found that the active transmission line of FIG. 3a generates a correct post-synaptic potential which can be exploited to implement neural network algorithms.

Figure 3C:
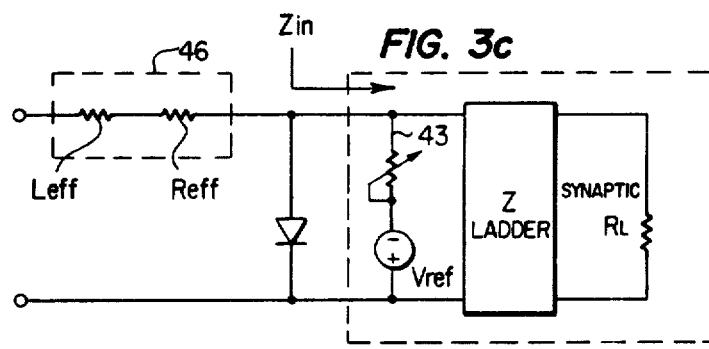
FIG. 3c is a schematic diagram of one stage of a cascaded LC network formed by the modules of FIG. 3a showing how variations in the impedance of the network emulate different neural behaviors.

Variations in the equivalent inductance "L" of the solitary wave circuit 46 advantageously alters the circuit's response, thereby enabling the circuit to emulate the various component parts of a neuron or neuron types. This aspect of the invention is shown in FIG. 3c, which is a schematic diagram of one stage of a cascaded LC network. As seen in FIG. 3c, the inductance circuit 46 possesses an effective inductance $L_{eff}$ and an effective resistance $R_{eff}$. For any module in a cascaded LC network as shown in FIG. 3c, the remaining portion of the cascade has a complex impedance $Z_{in}$ as viewed from branch 43 of the module. This complex impedance includes a real resistive portion designated "$Re(Z_{in})$". The specific type of neuron behaviors exhibited by the invention are determined by the three (3) classes of modules generally described by the boundary conditions shown in FIG. 3c. In particular, if the sum of $R_{eff}$ and $Re(Z_{in})$ is very negative, then the node oscillates (Class I). If the sum of $R_{eff}$ and $Re(Z_{in})$ approaches zero, the node rings (Class II). If the sum of $R_{eff}$ and $Re(Z_{in})$ is very positive, the node is a lossless solitary wave nonlinear transmission line (Class III). Accordingly, the insertion of the appropriate or desired class of module interface into cascade determines the overall nerve circuit behavior.

If a stimulus is applied to input terminals 66 and 68 as shown in FIG. 3b and the ladder includes Class II module interfaces insufficient in number to produce a pacemaker function (Class I) the circuit generates an output pulse (i.e., a phasic encoder operation) or a plurality of output pulses (i.e., a burst encoder operation). The type of function depends on the quantity and the magnitude of the negative effective resistance $R_{eff}$.

Figure 4:
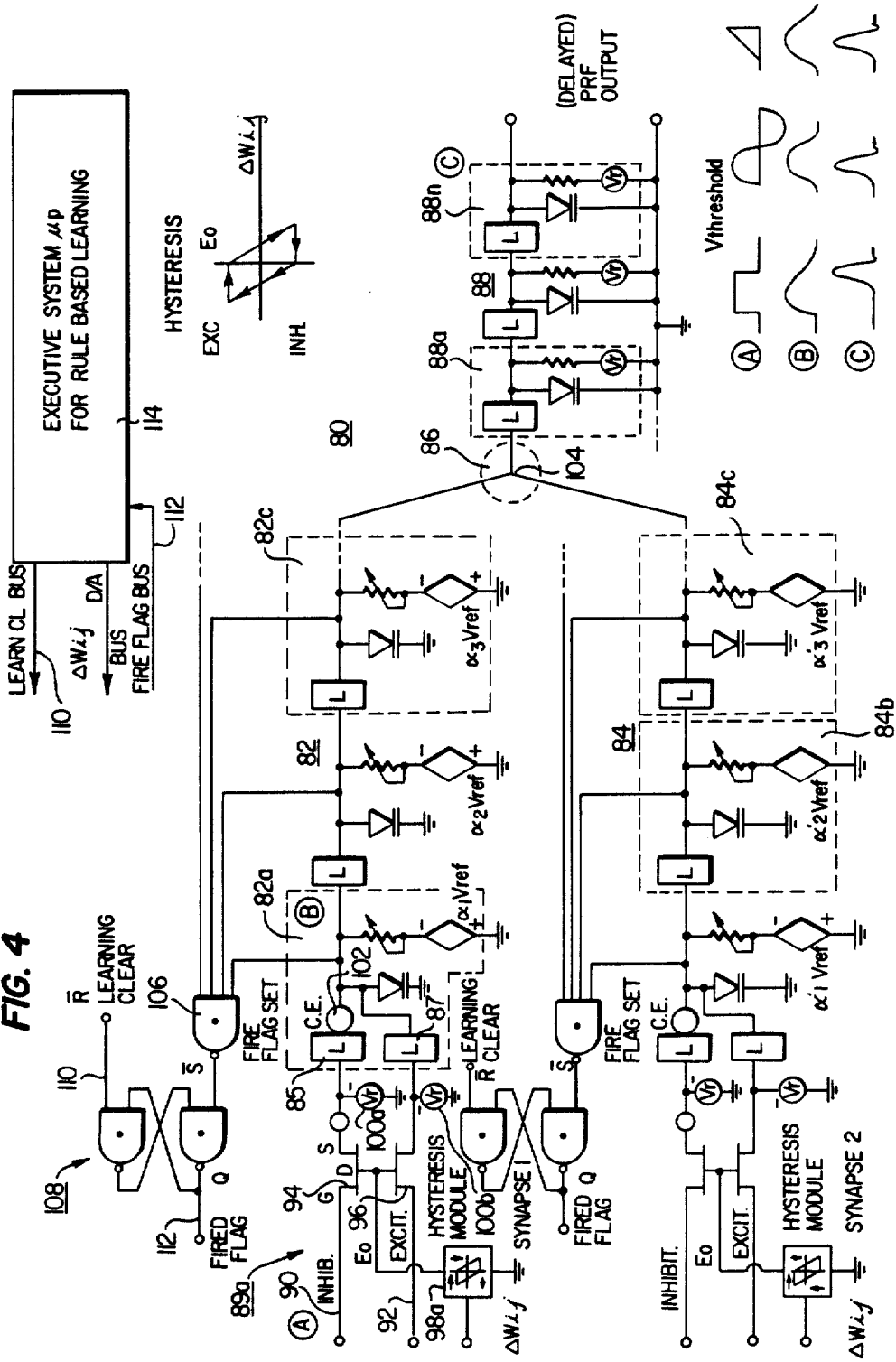
FIG. 4 is a simplified block diagram showing a neuron implemented by a plurality of the modules shown in FIG. 3.

Referring now to FIG. 4, a simple "two-input" neuron is emulated using a plurality of functional modules each comprising the solitary wave circuit 40 of FIG. 3. The neuron 80 includes two (2) dendrites 82 and 84, a cell body 86, and an axon 88. Dendrite 82 is formed by an LC network comprising the solitary wave circuits 82a, 82b and 82c, and dendrite 84 is formed by an LC network comprising solitary wave circuits 84a, 84b and 84c. Insertion of a Class I interface into the dendrites or sufficient quantities of Class II module interfaces along the dendrites yields a pacemaker output. The bulk of the axon 88 should be Class III which, as described above, is the lossless solitary wave nonlinear transmission line.

Referring now in detail to FIG. 4, each of the solitary wave circuits 82a and 84a include an identical pair of active inductor circuits 85 and 87 for receiving weighted "inhibitory" or "excitatory" input signals generated by a "synaptic" input circuit. For example, dendrite 82 includes an input circuit 89a having inhibitory and excitatory inputs 90 and 92 for receiving inhibitory or excitatory signals. The inputs 90 and 92 are applied to the gate terminals of a pair of source-connected JFET transistors 94 and 96. The source terminals of the transistors 94 and 96 are connected to a hysteresis module 98a for generating a "weighted" inhibitory or excitatory signal at the drain terminals of the transistors 94 and 96. The "weight" stored within the hysteresis module 98a is altered to change the synaptic efficacy. The input circuit 89a also includes voltage reference circuits 100a and 100b connected to the drain terminals of the transistors 94 and 96 to form an input node for an EEG slow wave potential. Moreover, a common emitter inverter circuit 102 is connected to the output of the inductor circuit 85 to invert any applied logical inhibitory signal to produce a negative wave. In particular, circuits 85 and 87 both generate an excitatory post-synaptic potential (EPS) and circuit 102 inverts the output of circuit 85 to generate an inhibitory post-synaptic potential (IPSP).

The outputs of solitary wave circuits 82c and 84c are summed at the cell body node 104. If the value of the signal at node 104 is higher than a predetermined value, the neuron "fires", and therefore an action potential solitary wave or burst of waves is transmitted through the axon comprising a third LC ladder network 88a, 88b ... 88n. The net amount of propagation delay in the axon is determined by the number of modules in the third LC ladder network, with each module possessing a propagation delay equal to the square root of the quantity (LC).

According to the invention, the effective impedance in each component of the neuron varies. At the synapses, the effective impedance (i.e., effective series resistance) in active circuits 85 and 87 has an resistance value greater than zero. In the dendrites, the impedance has an effective resistance value less than or equal to zero and, in the axon, the resistance value varies from negative to positive. Adjustment of the magnitude of the module effective resistance generates various types of information encoding on the waveform. For example, pulse position or frequency modulation occurs (see FIG. 3b) for effective resistance values of the magnitude (approximately 10.0G) while single pulses occur for effective resistance values greater than 10.0G.

As also seen in FIG. 4, signals at various positions along the dendrites can be applied to NAND gate 106 and then input to a flip-flop circuit 108. The flip-flop circuit includes a "learn" input 110 and a "fired" output 112. The collective inputs 110 and the collective outputs 112 are advantageously controlled by a microprocessor-based control system 114 for rule-based learning using neural network algorithms. In this manner, the neuron 80 can be used as a basic building block of an associative long term memory and parallel distributed processing system. Alternatively, each of the modules can be used for pattern recognition or other learning-type applications. Such applications are possible due to the fact that interconnected modules such as shown in FIG. 4 exhibit the capability to "learn" in real-time. Moreover the signal waveshapes generated by the solitary wave circuits described herein are biocompatible and of physiological magnitudes. The reference voltage 45 of FIG. 3a can be either the local tissue potential or the EEG slow wave. The principles of the subject invention can be implemented as a modular component of a prosthetic device; e.g., as an EEG phase-stored distributed memory. The distributed memory can optimize the performance of the prosthetic by increasing the signal-to-noise ratio for behavior pattern recognition of the prosthetic.

Although the invention has been described and illustrated in detail, the same is by way of example only and should not be taken by way of limitation. The spirit and scope of the present invention are limited only to the terms of the appended claims.

I claim:

1. A circuit for emulating action potential propagation through a portion of a neuron, comprising:
   a plurality of series-connected "L" stages, each of the "L" stages comprising:
   a first shunt branch having a variable capacitor;
   a second shunt branch having a conductance and a d.c. bias means connected in series; and a third branch connected in series to the first and second branches, the third branch having an inductance means including one or more operational amplifier means adapted to form an inductor, wherein the inductor and the variable capacitor cooperate to generate a solitary wave output representing an action potential through the portion of the neuron.

2. The circuit for emulating action potential propagation through a portion of a neuron as described in claim 1 wherein the operational amplifier means includes at least first and second operational amplifiers each having an internal input resistance, a pair of input terminals, and an output terminal.

3. The circuit for emulating action potential propagation through a portion of a neuron as described in claim 2 wherein the operational amplifier means further includes first and second impedance means connected between the input terminals of the first operational amplifier, and wherein the output terminal of the second operational amplifier is connected to a node between the first and second impedance means.

4. The circuit for emulating action potential propagation through a portion of a neuron as described in claim 3 wherein the first impedance means is a resistor and the second impedance means is a capacitor.

5. The circuit for emulating action potential propagation through a portion of a neuron as described in claim 2 wherein the operational amplifier means further includes third and fourth impedance means connected between the input terminals of the second operational amplifier, and wherein the output terminal of the first operational amplifier is connected to a node between the third and fourth impedance means.

6. The circuit for emulating action potential propagation through a portion of a neuron as described in claim 5 wherein the third and fourth impedance means are each resistors.

7. The circuit for emulating action potential propagation through a portion of a neuron as described in claim 5 further including a resistor connected in series to the fourth impedance means.

8. A circuit for emulating action potential propagation through a portion of a neuron, comprising:
a plurality of series-connected "L" stages having a complex impedance $Z_{in}$, each of the "L" stages comprising:
a first shunt branch having a variable capacitor;
a second shunt branch having a conductance and a d.c. bias means connected in series; and
a third branch connected in series to the first and second branches, the third branch having an inductance means including first and second operational amplifiers adapted to form an inductor, wherein the inductor and the variable capacitor cooperate to generate a solitary wave output representing an action potential through the portion of the neuron.

9. The circuit for emulating action potential propagation as described in claim 8 wherein the inductance means further includes:
first and second impedance means connected between the input terminals of the first operational amplifier, the first and second impedance means interconnected at a node to which the output terminal of the second operational amplifier is connected;
third and fourth impedance means connected between the input terminals of the second operational amplifier, the third and fourth impedance means interconnected at a node to which the output terminal of the first operational amplifier is connected; and
a resistor connected in series to the fourth impedance means.

10. The circuit for emulating action potential propagation as described in claim 8 wherein the inductance means includes an effective resistance $R_{eff}$ and the complex impedance includes a resistance $Re(Z_{in})$.

11. The circuit for emulating action potential propagation as described in claim 10 wherein the circuit oscillates when the sum of $R_{eff}$ and $Re(Z_{in})$ is substantially less than zero.

12. The circuit for emulating action potential propagation as described in claim 10 the circuit rings when the sum of $R_{eff}$ and $Re(Z_{in})$ is substantially equal to zero.

13. The circuit for emulating action potential propagation as described in claim 10 wherein the circuit acts as a lossless solitary wave transmission line when the sum of $R_{eff}$ and $Re(Z_{in})$ is substantially greater than zero.

14. A circuit for emulating action potential propagation through a neuron, the neuron having at least one dendrite, a cell body and an axon, comprising:
first and second ladder networks each having an input and an output;
means connected to the input of each of the ladder networks for receiving a weighted inhibitory or excitatory signal and in response thereto generating a potential at the outputs of the ladder networks;
means for summing the outputs of the first and second ladder networks;
a third ladder network having an input connected to the summing means, and an output for generating a signal representing an action potential through the neuron; and
wherein each of the ladder networks includes a plurality of series-connected "L" stages, each of the "L" stages comprising a first shunt branch having a variable capacitor, a second shunt branch having a conductance and a d.c. bias means connected in series and a third branch connected in series to the first and second branches, the third branch having an active inductance circuit.

* * * * *